(12) United States Patent
Chian

(10) Patent No.: US 6,400,560 B1
(45) Date of Patent: Jun. 4, 2002

(54) ENGAGING DEVICE FOR A COMPUTER SCREEN IN A CAR

(76) Inventor: Yue-Hui Chian, 2F No. 10 Alley 6, Lane 45, Pao Hsing Road, Hsin Tien, Taipei Hsien (TW)

(*) Notice: Subject to any disclaimer, the term of this patent is extended or adjusted under 35 U.S.C. 154(b) by 0 days.

(21) Appl. No.: 09/708,056

(22) Filed: Nov. 8, 2000

(51) Int. Cl.7 .................................................. H05K 7/16
(52) U.S. Cl. ....................... 361/681; 361/682; 345/169; 248/917; 360/97.01; 312/223.1
(58) Field of Search ................................. 361/681–682, 361/685–687; 345/169, 905; 312/223.1–223.6, 223.72; 248/917–920; 360/97.01, 137

(56) References Cited

U.S. PATENT DOCUMENTS

| | | | |
|---|---|---|---|
| 5,600,538 A | * | 2/1997 | Xanthopoulos ............. 361/683 |
| 6,191,940 B1 | * | 2/2001 | Ma ............................. 361/681 |
| 6,233,138 B1 | * | 5/2001 | Osgood ....................... 361/681 |

* cited by examiner

Primary Examiner—Leo P. Picard
Assistant Examiner—Hung Van Duong
(74) Attorney, Agent, or Firm—Troxell Law Office PLLC

(57) ABSTRACT

An engaging device for a computer screen in a car, comprises a fixing base fixedly attached in the car, lock block, and a coupling frame attached to the rear side of the computer screen. The lock block is rotatably engages with the fixing base by way of two pivots. The pivots have a function of stagnating the lock block at specific angular position optionally. Both lateral sides of the coupling frame have a locking hole respectively and the lock block at both lateral sides thereof provides an elastic engaging plate therein. The respective elastic engaging plate has a part extending outward through the locking hole. Once the lock block is inserted into the coupling frame, a detachable firm engagement between the lock block and the coupling frame can be reached substantially.

4 Claims, 6 Drawing Sheets

ENGAGING DEVICE FOR A COMPUTER SCREEN IN A CAR

BACKGROUND OF THE INVENTION

1. Field of The Invention

The present invention relates to an engaging device for a computer screen in a car, and particularly to an engaging device, with which a computer screen used in a car is detachably connected to a fixing base by way of inserting and coupling so as to prevent from being stolen.

2. Description of Related Art:

The prior art of fixing frame for a computer screen in a car usually has a fixing base associated with the computer screen by way of fastening because the size of the computer screen used in a car is not large, it can be mounted, on the dash panel or behind the pillow top of respective front seat such that peoples it the front seats and the rear seat can watch the image in the respective screen. However, it is easy for others to see the computer screen on the dash panel or at the top of the front seat. It is known that the computer used in a tar is an expensive article and very liable to be stolen by a thief. Therefore, it is useful to develop an engaging device, which is possible to detachably fix a computer screen used in a car.

The conventional fixing frame for the computer screen on the dash panel is stationary and has the following disadvantages:

1. Once the car stops and all the people have to leave the car, it is necessary to have the computer screen be covered by a protective. But, the protected object is abrupt on the dash panel so that it is easy to be distinguished by others outside the car. Hence, The computer screen still has to confront the danger of being stolen.

2. Because the fixing base fixedly engages with the computer screen, the computer screen is not adjustable in any other angular position. In addition, the computer screen usually is liquid crystallized display (LED) and it is hard to recognize the image in the screen clearly As long as the light source outside the car is reflected by the screen.

3. In case of the car having to be driven by different persons in turns, the computer screen being not possible to be made an angular adjustment upward or downward to meet each person's need individually for preventing from reflection may result in the computer screen becomes less utilized.

4. When the computer screen is mounted at the rear side of a front seat at the adjustable pillow top thereof, it should have a function that the computer screen can be adjusted an angle upward or downward. Otherwise, it is not possible for the person at the rear seat to clearly see the LCD while the pillow top is turned an angle by the person at the front seat.

Therefore, a fixing device for a smooth computer screen in a car is really needed to meet the requirements: 1. The computer screen can be detached and at any time. 2. The computer screen can be disposed with an angular adjustment optionally,

SUMMARY OF THE INVENTION

An engaging device for a computer screen in a car according to the present invention is composed of a fixing base with engaging holes, a plurality of pivots, a lock block, an elastic engaging plate, and the computer screen. The fixing base may be mounted on the dash panel, the pillow part at the top of the respective front seat, or the ceiling. Because the pivots are disposed between the computer screen and the fixing base to be located at any angular position optionally. The lock block with the elastic engaging plate therein is disposed on the fixing base to connect with a coupling frame at the rear side of the computer screen. When the lock block is inserted into the coupling frame, the elastic engaging plate engages with a lock hole to form a better engagement without any clearance. Thus, a power socket on the lock block is possible to connect with connecting pins on the computer screen steadily for preventing from a bad power contact.

Accordingly, a primary object of the present invention is to provide an engaging device for a computer screen in a car, with which the computer screen can be detachedly fixed to prevent from being stolen by a thief.

Another object of the present invention is to provide an engaging device for a computer screen in a car, with which the computer screen can be turned an angle upward and downward optionally to adapt with the refraction of light for a best sight.

BRIEF DESCRIPTION OF THE DRAWINGS

The detail structure, the applied principle, the function and the effectiveness of the present invention can be more fully understood by referring to the following description and accompanying drawings, in which.

DETAILED DESCRIPTION OF THE PREFERRED EMBODIMENT

Figure 1:
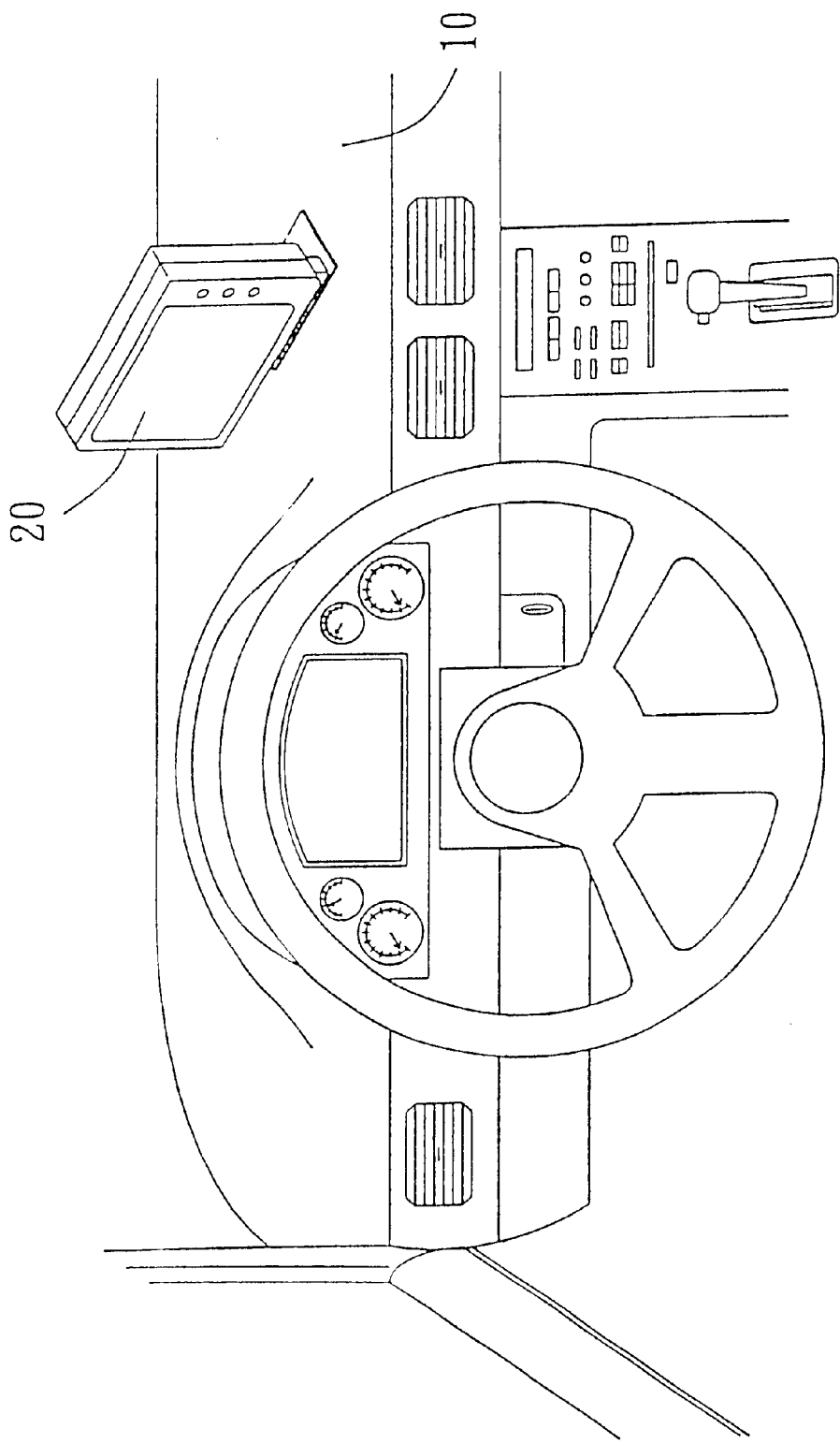
FIG. 1 is a perspective view of an engaging device for a computer screen in a car in an embodiment thereof.
Figure 2:
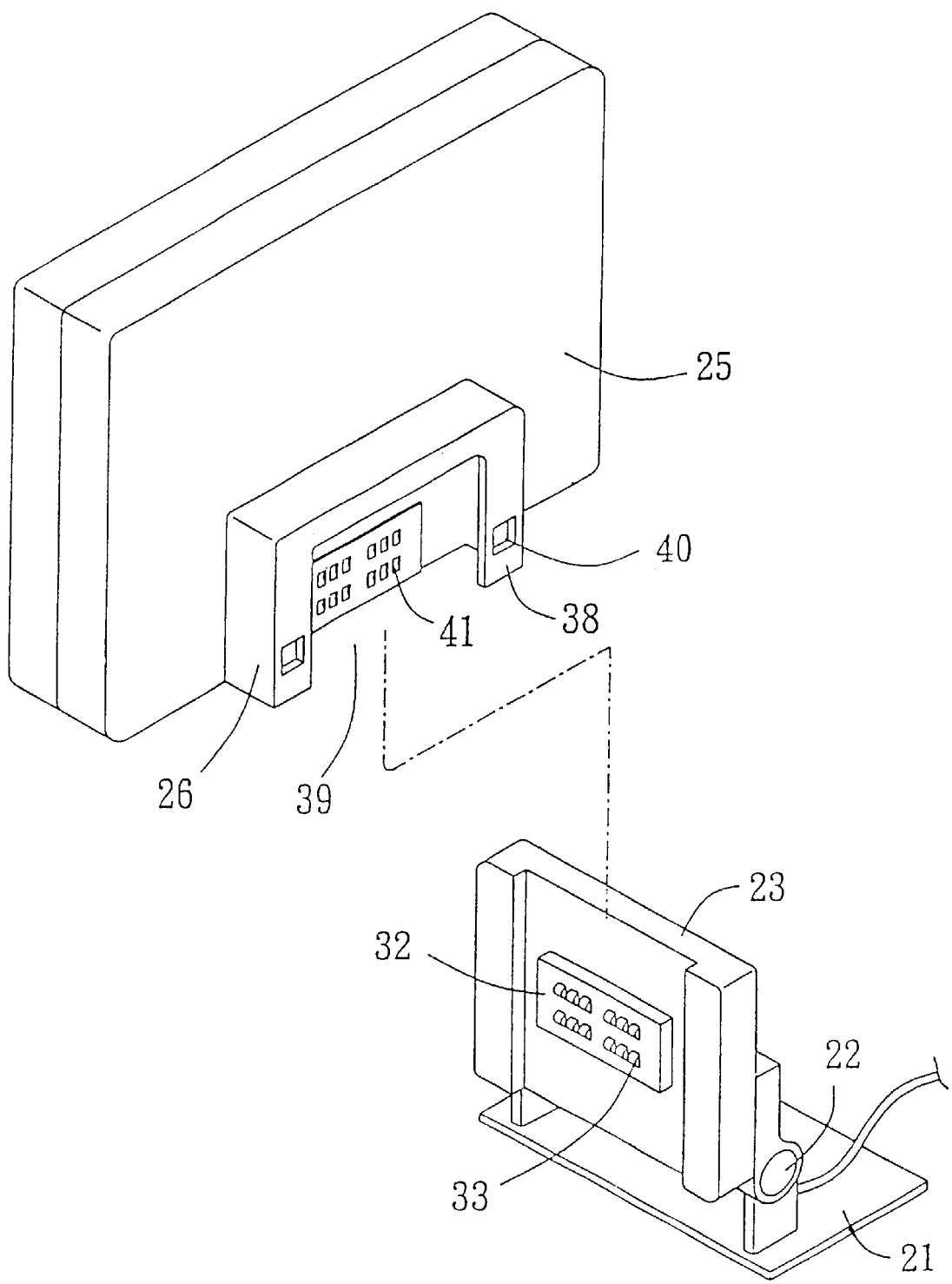
FIG. 2 is an disassembled perspective view of the engaging device shown in FIG. 1.

Referring to FIG. 1, a preferred embodiment of the present invention is illustrated to have a computer used in a car 20 on the dash panel 10 by way of an engaging device according to the present invention. Referring to FIG. 2, the engaging device comprises a fixing base 21, two pivots 22, a lock block 23, two elastic engaging plates 24, a computer screen 25, and a coupling frame 25. The pivots 22 have a function to stagnate the coupling frame 26 at a specific angular position. The coupling frame 26 connects with the tear side of the computer screen.

Figure 3:
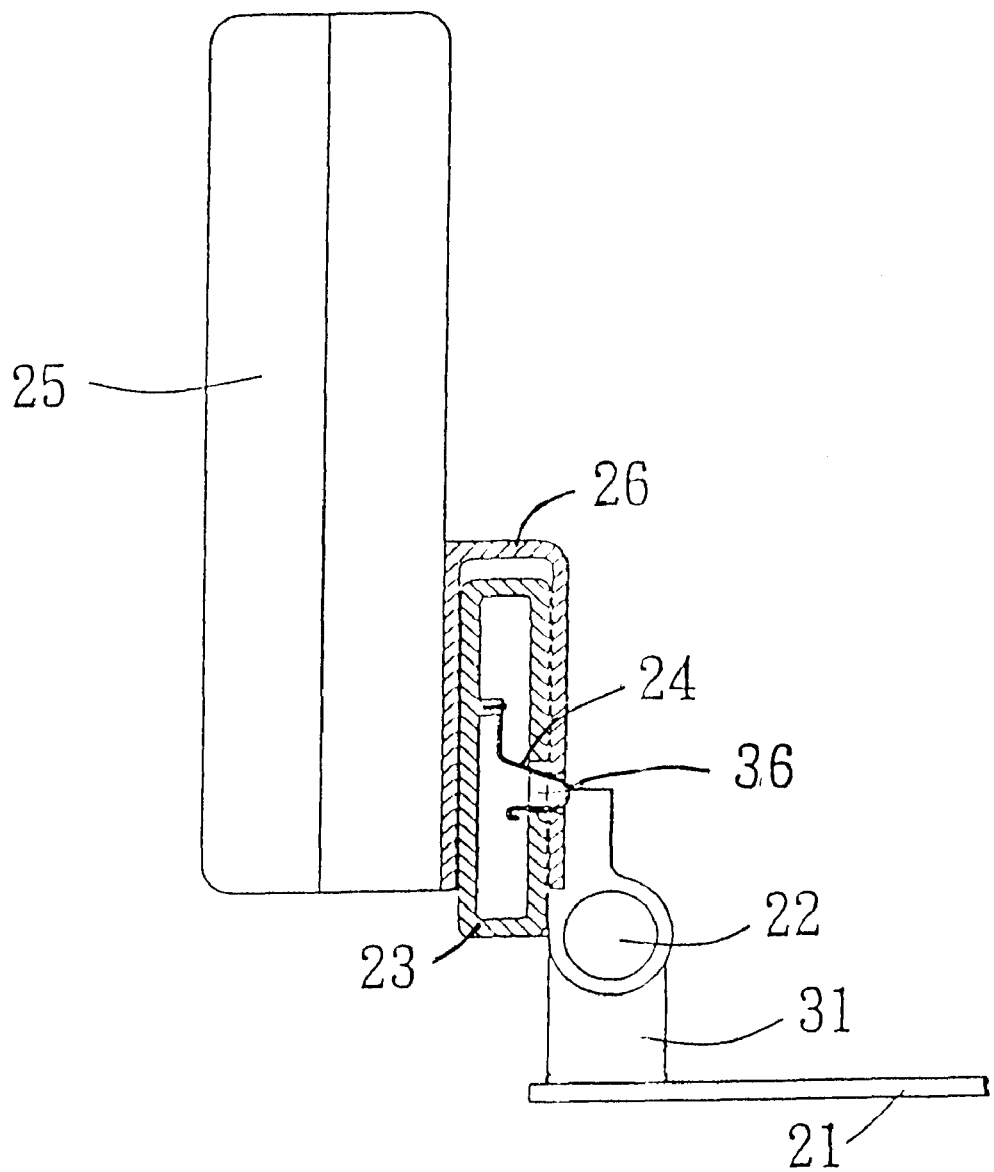
FIG. 3 is a partly sectional view of the engaging device shown in FIG. 1 illustrating an elastic engaging plate therein.
Figure 4:
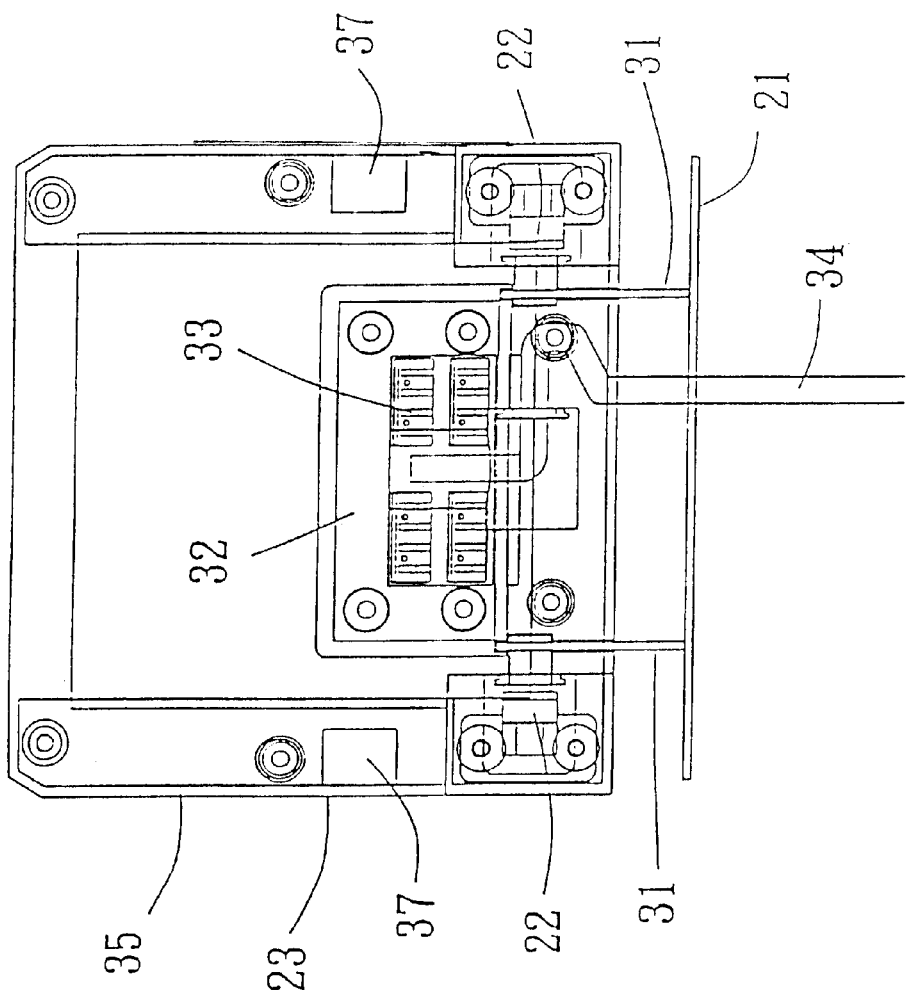
FIG. 4 is a rear view of the engaging device shown in FIG. 1.
Figure 5:
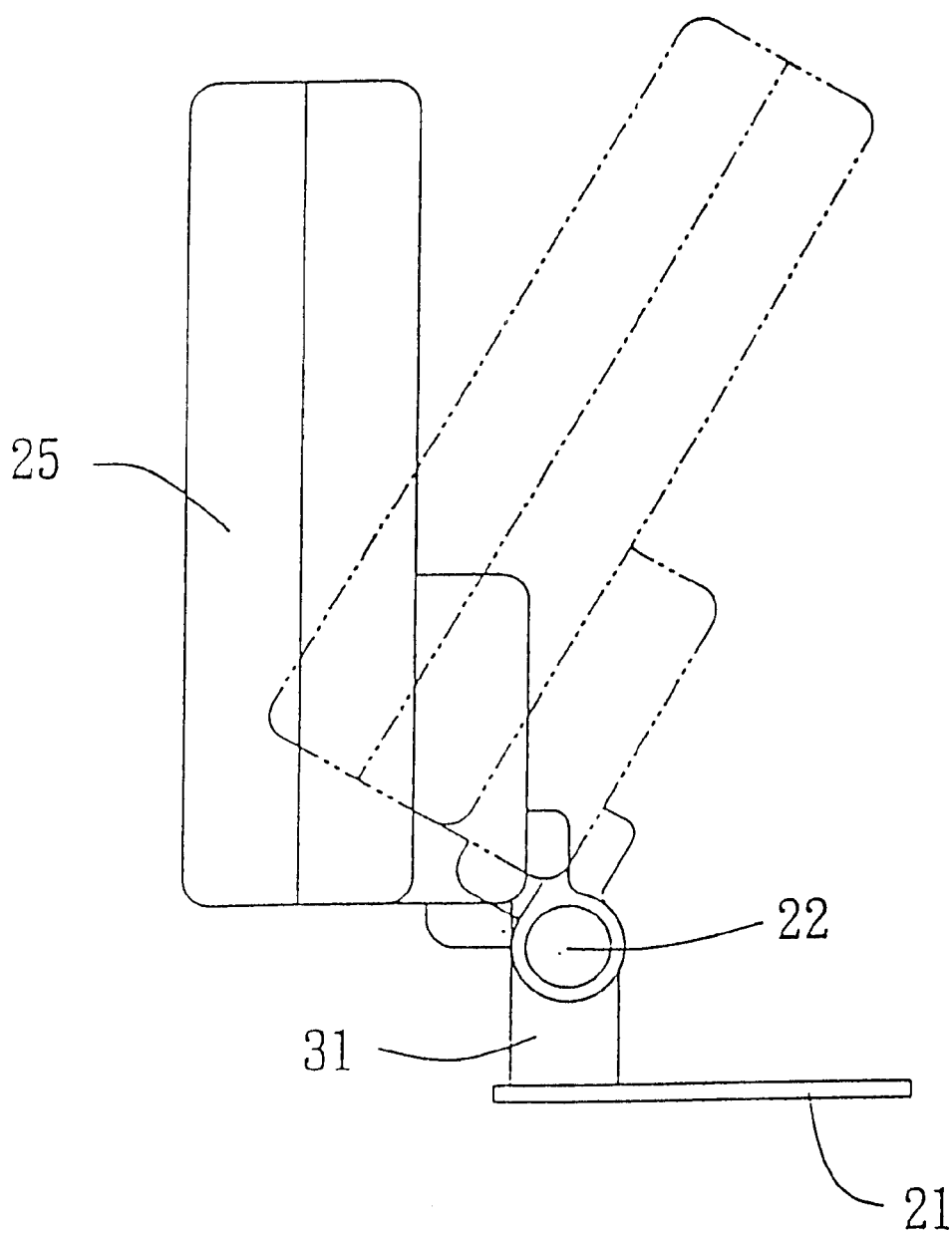
FIG. 5 is a side view of the engaging device shown in FIG. 1 illustrating the computer screen being possible to be adjusted an angular position optionally.

Referring to FIGS. 3 and 4, the fixing base 21 is a flat plate integrated with a fixing plate 31 erecting upward. Said two pivots 22 are oppositely disposed on the fixing plate 31 and may stagnate the lock block 23 at a specific angular position after being rotated. An end of the respective pivot 22 is fixed to the lock block 23 at the inner side thereof and the other end of the respective pivot 22 is fixed to the fixing plate 31. Thus, the lock block 23 may be rotated relative to the fixing plate 31 with respect to the pivots 22 and stagnate at a specific angular position by way of the torsion of the pivots 22. A power socket panel 32 is provided with a plurality of elastic outlet ends and a power source wire 34 for externally connecting with the power source. The power socket panel 32 is fastened to a frame recession at the central part thereof in the lock block 23, Both lateral sides of the lock block engage with the elastic engaging plate 24 respectively. The lock block 23 at the rear side thereof is attached a facial plate 35 and the facial plate 35 at both lateral sides thereon have an opening 36 respectively and a bent part 37 of the respective elastic engaging plate 24 extends outward through the respective opening 36.

Referring to FIGS. 2 and 3 again, the coupling frame 26 is provided at the rear side of the computer screen 25 and has a locking edge 38 at three lateral sides thereof respectively and a central space 39 enclosed by these three locking edges 38. A respective engage hole 40 is disposed near the lower end of the left and the right locking edges corresponding to the outward bents of the elastic engaging plates 24. Connecting pin ends 41 of power supply for the computer Screen are provided in the central space 39. When the lock block 23 is inserted into the central space 39 from the lower opening end of the central space 39, the elastic outlet ends 33 on the power socket panel 32 may press against connecting pin ends 41 successfully. Meanwhile, the bent part 37 of each elastic engaging plate 24 has a slant portion sliding into the engaging holes 40 respectively so as to constitute an extremely firm engagement between the lock block 23 and the coupling frame 26. Hence, an improper power contact As not possible to occur for the engaging device of the present invention.

While the entire lock block 23 is engaged in the coupling frame 26, the periphery of the lock block 23 engages with the locking edges 38 completely for preventing from loosening apart.

When the computer screen 25 is going to be apart from the lock block 23, the operation can be easily performed by the following way. The computer screen 25 is hold by the hands and the bent part 37 on the respective elastic engaging plate 24 is press inward lightly by the middle finger of both hands respectively, Then, the computer screen 25 is pulled upward to separate from the lock block 2.

Figure 6:
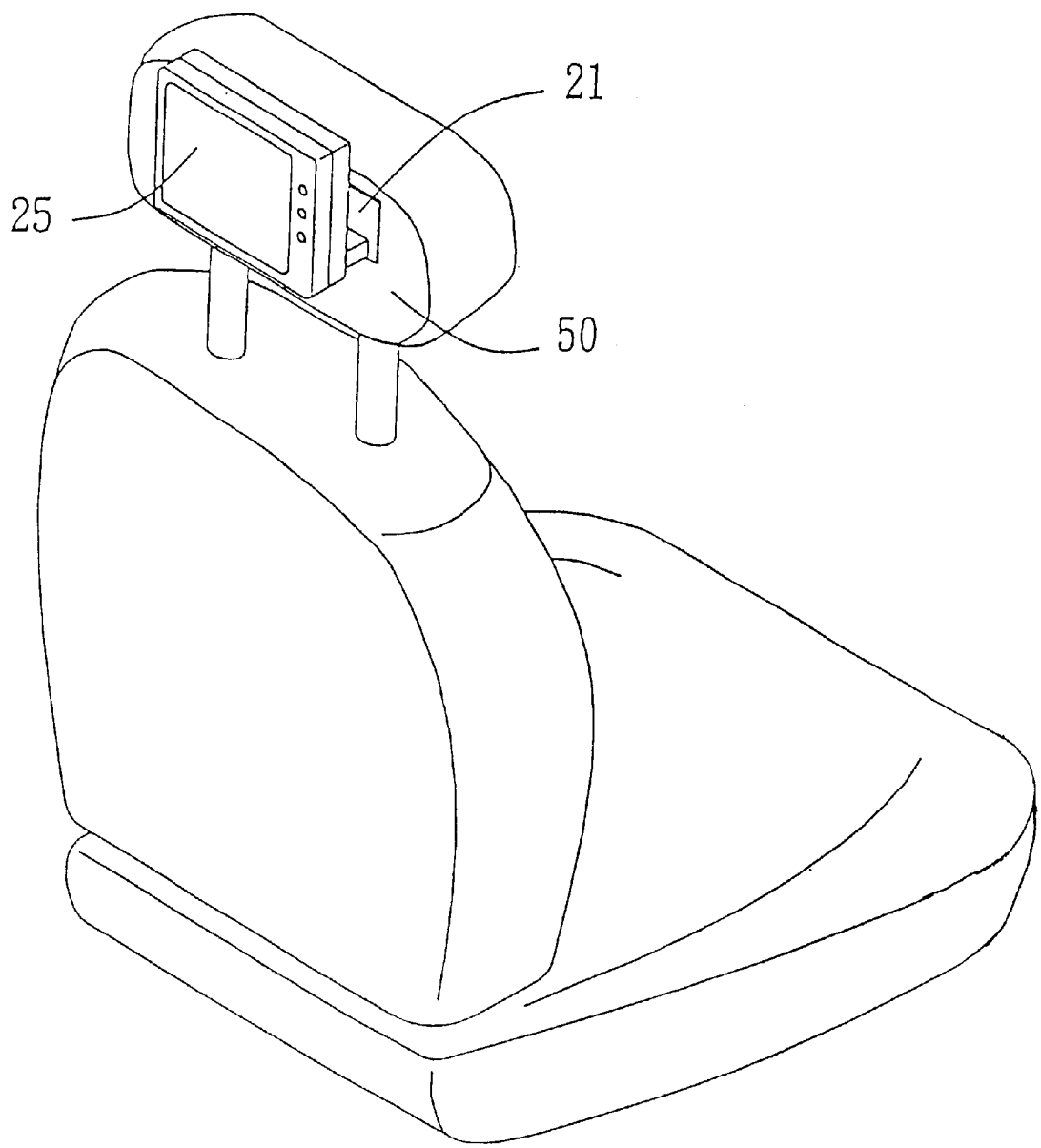
FIG. 6 is a perspective view of an engaging device for a computer screen in a car in another embodiment thereof.

Referring to FIG. 6, another embodiment is illustrated that the engaging device of the present invention is attached to rear side of the pillow top 50 for locating the computer screen 25. Hence, people sitting on the rear seat can have a clear sight to a watch the computer screen.

It can be understood from above description of preferred embodiments that the present invention provides a convenient engaging device for detachably mounting the computer screen in a car with an adjustable angular position. Furthermore, it is appreciated that the present invention offers a substantial improvement in usefulness for practical application and effectiveness for economics and overcomes the deficiency of prior art against the thief.

While the invention has been described with referencing to preferred embodiments thereof, it is to be understood that modifications or variations may be easily made without departing from the spirit of this invention, which is defined by the appended claims.

What is claimed is:

1. An engaging device for a computer green in a car, comprising:
   a fixing base, being fixedly attached to a proper location in the car; and
   a lock block, fitting with the fixing base characterized in that the lock block is rotatably engages with the fixing base by way of two pivots to be stagnated at a specific angular position optionally; a coupling frame is provided at a rear side of the computer screen and both lateral sides of the coupling frame having a locking hole respectively; the lock block at both lateral sides thereof provides an elastic engaging plate therein and the elastic engaging plate having a part extending outward through the locking hole;
   whereby, once the lock block is inserted into the coupling frame, a detachable firm engagement between the lock block and the coupling frame can be reached substantially.

2. The engaging device for a computer screen in a car as defined in claim 1, wherein the lock block has a frame recession at the central part thereof to be fastened a power socket panel with a plurality outlet ends; and a power source wire externally connects with the lock block.

3. The engaging device for a computer screen in a car as defined in claim 1, wherein the elastic engaging plate has a bent part and a facial plate with opening is attached to a rear side of the lock block such that the bent part may expose from the opening.

4. The engaging device for a computer screen in a car as defined in claim 1, wherein the coupling frame has a locking edge at three lateral sides thereof respectively and a central space enclosed by said locking edges; and a respective engaging hole is disposed near the lower end of two opposites ones of the locking edges corresponding to the outward bents of the elastic engaging plates.

* * * * *